(12) United States Patent
Gattei

(10) Patent No.: US 10,344,988 B2
(45) Date of Patent: Jul. 9, 2019

(54) OVEN FOR BAKING FOOD PRODUCTS

(71) Applicant: Electrolux Home Products Corporation N. V., Brussels (BE)

(72) Inventor: Lorenzo Gattei, Forli (IT)

(73) Assignee: Electrolux Home Products Corporation N.V., Brussels (BE)

( * ) Notice: Subject to any disclaimer, the term of this patent is extended or adjusted under 35 U.S.C. 154(b) by 393 days.

(21) Appl. No.: 14/375,666

(22) PCT Filed: Mar. 12, 2013

(86) PCT No.: PCT/EP2013/054958
§ 371 (c)(1),
(2) Date: Jul. 30, 2014

(87) PCT Pub. No.: WO2013/152912
PCT Pub. Date: Oct. 17, 2013

(65) Prior Publication Data
US 2015/0300654 A1    Oct. 22, 2015

(30) Foreign Application Priority Data

Apr. 11, 2012 (EP) .................................... 12163668

(51) Int. Cl.
| | |
|---|---|
| *F24C 15/32* | (2006.01) |
| *A47J 27/04* | (2006.01) |
| *F24C 15/00* | (2006.01) |
| *F22B 1/28* | (2006.01) |

(52) U.S. Cl.
CPC ............ *F24C 15/327* (2013.01); *A47J 27/04* (2013.01); *F22B 1/284* (2013.01); *F24C 15/003* (2013.01); *F24C 15/325* (2013.01)

(58) Field of Classification Search
CPC ......... A47J 27/04; F24C 15/003; F24C 15/32; F24C 15/322; F24C 15/325; F24C 15/327
See application file for complete search history.

(56) References Cited

U.S. PATENT DOCUMENTS

| | | | | |
|---|---|---|---|---|
| 4,031,911 | A | * | 6/1977 | Frazar ................... D06F 39/045 137/3 |
| 5,370,758 | A | * | 12/1994 | Bourjala ................ B65D 11/10 156/227 |
| 6,395,215 | B1 | * | 5/2002 | Distelhoff ............. B29C 65/342 156/274.2 |
| 2005/0087528 | A1 | | 4/2005 | Kanzaki et al. |

(Continued)

FOREIGN PATENT DOCUMENTS

| | | |
|---|---|---|
| DE | 102007048567 | 4/2009 |
| FR | 2614976 | 11/1988 |
| FR | 2678359 | 12/1992 |

OTHER PUBLICATIONS

International Search Report for PCT/EP2013/054958, dated Jun. 27, 2013, 2 pages.

*Primary Examiner* — Tu B Hoang
*Assistant Examiner* — Erin E McGrath
(74) *Attorney, Agent, or Firm* — Pearne & Gordon LLP

(57) ABSTRACT

The baking chamber (3) of an oven for baking food products is connected to a steam generator (8), which communicates with a water containing tank (7) defined by two shells (10*a*, 10*b*), which are permanently connected to each other along a junction line (15).

16 Claims, 4 Drawing Sheets

(56) References Cited

U.S. PATENT DOCUMENTS

2006/0249136 A1* 11/2006 Reay .................... F24C 15/327
126/20
2007/0062927 A1* 3/2007 Sells .................... F24C 15/327
219/401

* cited by examiner

OVEN FOR BAKING FOOD PRODUCTS

The present invention refers to an oven for baking food products.

In particular, the present invention is relative to an oven of the type comprising a baking chamber provided with a door for the introduction of the food products to be baked; a support frame, which extends around the baking chamber, and is thermally insulated from the baking chamber itself; a heating device, which is arranged inside the baking chamber, so as to provide the heat needed to bake the food products; and a feeding device for feeding steam into the baking chamber itself.

Generally, a feeding device of known type comprises a water tank, which is fitted to the support frame, a tank filling duct, to which the user has access from a front wall of the oven, a discharge duct for discharging the water contained in the tank outside of the oven, a steam generator, which communicates with the tank, and a feeding circuit for feeding the steam produced by the steam generator into the baking chamber.

In order to prevent water from being fed into the feeding circuit and, thus, into the baking chamber, the feeding device comprises, furthermore, a separation chamber, which is separate from the tank, is arranged between the steam generator and the feeding circuit, and is suitable to separate the water from the steam and to recirculate the water again to the inlet of the steam generator.

The tank normally comprises a cup-shaped container, and a closing lid, which is mounted on the cup-shaped container in a removable manner and is coupled in a fluid-tight manner to the cup-shaped container itself by means of the interposition of a plurality of gaskets.

The feeding device presents, furthermore, a filter, which is normally mounted inside the tank, so as to filter the water fed to the aforementioned discharge duct, and a level sensor for controlling the water level inside the tank itself.

The known ovens for baking food products of the type described above present some drawbacks, which are mainly caused by the fact that the tank is relatively complex and expensive to be produced due to the presence of the cup-shaped container, of the closing lid, and of the gaskets, i.e. of a relatively high number of components.

Furthermore, the assembling of the cup-shaped container, of the closing lid, and of the gaskets has to be performed along the assembly line of the oven and leads, therefore, to a relatively long assembling cycle and to the possibility of assembling mistakes.

The drawbacks described above are further increased by the fact that the aforementioned separation chamber is distinct and separate from the tank and has to be connected to the tank itself by means of the interposition of a feeding duct.

It is an object of the present invention to provide an oven for baking food products designed to eliminate the aforementioned drawbacks in a straightforward, relatively low-cost manner.

According to the present invention, there is provided an oven for baking food products as claimed in any of the following claims.

The present invention will now be described with reference to the accompanying drawings, which show a non-limiting embodiment, wherein.

Figure 1:
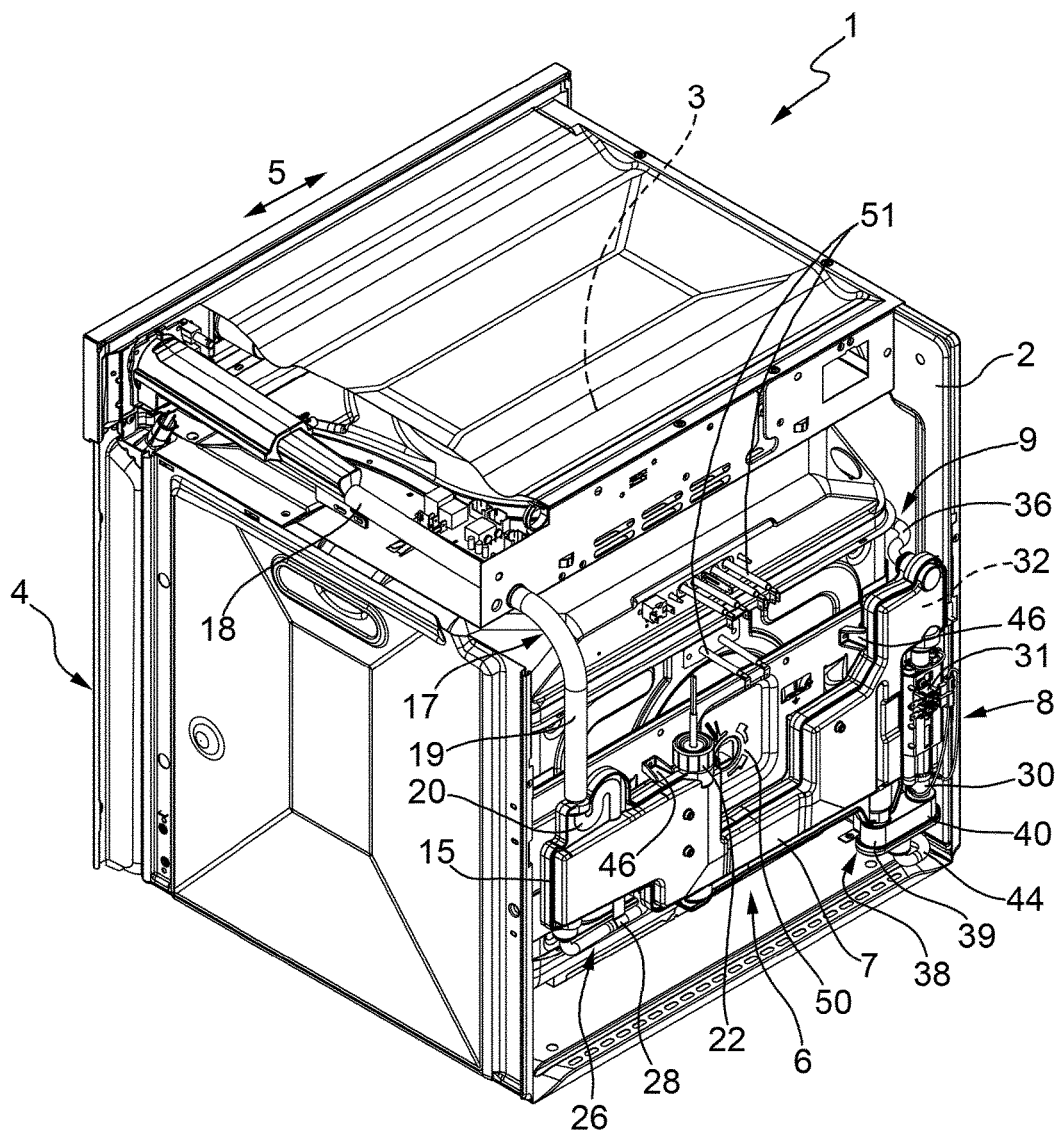
FIG. 1 shows a first schematic rear view in perspective of a preferred embodiment of the oven according to the present invention.
Figure 2:
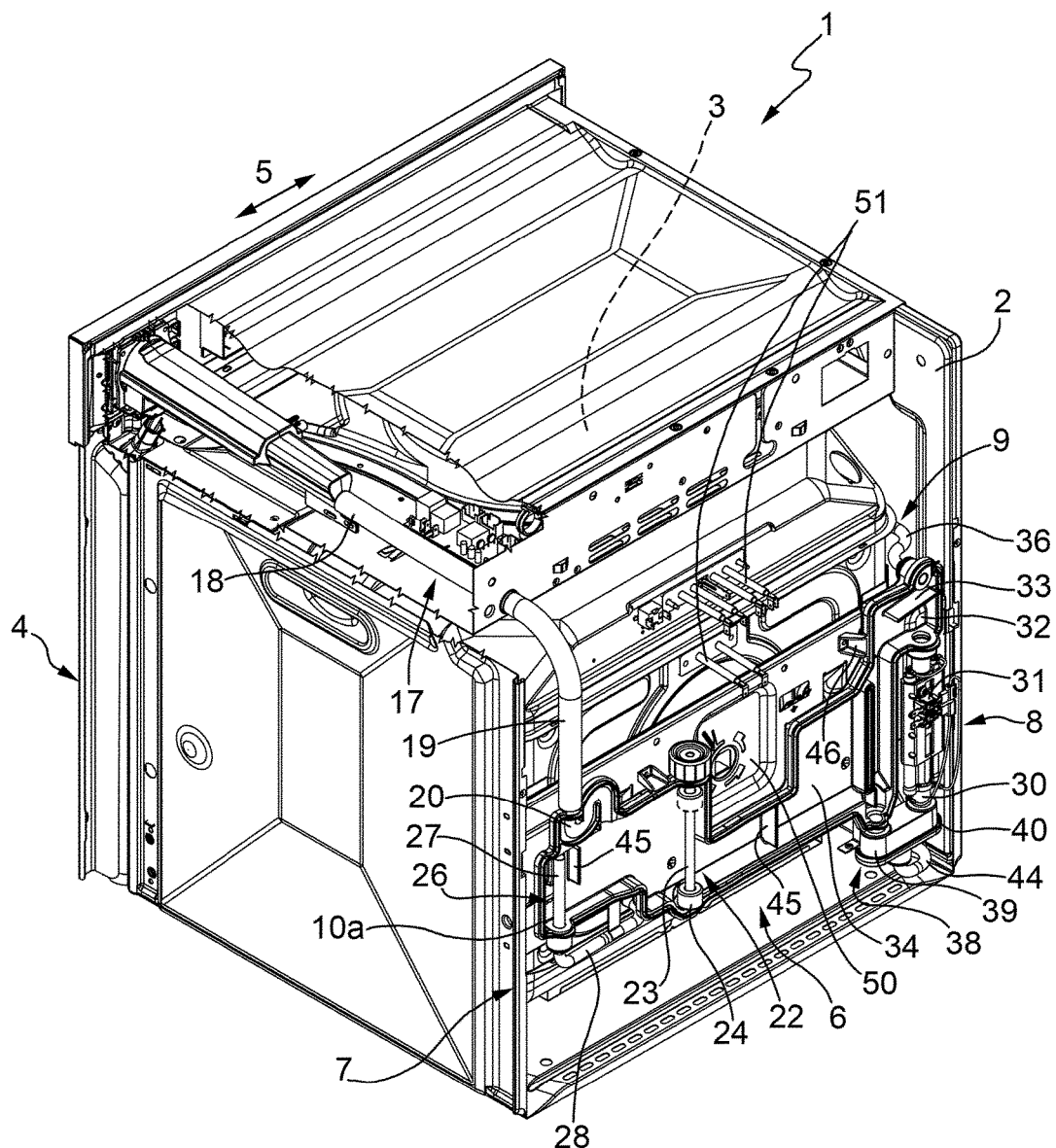
FIG. 2 shows a second schematic rear view in perspective, with parts removed for clarity, of the oven of FIG. 1.

Number 1 in FIGS. 1 and 2 indicates as a whole an oven for baking food products comprising a support frame 2 and a baking chamber 3, which is housed inside the frame 2 and is thermally insulated from the frame 2 itself by means of the interposition of a known insulating material, which is not shown.

The chamber 3 presents an opening (not shown), which allows the food products to be introduced inside the chamber 3, it is formed in correspondence to a front wall 4 of the oven 1, it extends in a substantially vertical containing plane, and is closed by a door (not shown), which is hinged to the frame 2 so as to rotate, with respect to the frame 2 itself, around a fulcrum axis (not shown), which may be parallel or perpendicular to a substantially horizontal direction 5.

The oven 1 is provided, furthermore, with a heating device 51, which is arranged inside the chamber 3, so as to provide the heat needed to bake the food products present inside the chamber 3 itself.

The oven 1 comprises, furthermore, a feeding unit 6, which is suited to feed steam into the chamber 3, and comprises, in turn, a tank 7 for containing water, a steam generator 8 communicating with the tank 7, and a feeding circuit 9 for feeding the steam produced by the generator 8 itself into the chamber 3.

Figure 4:
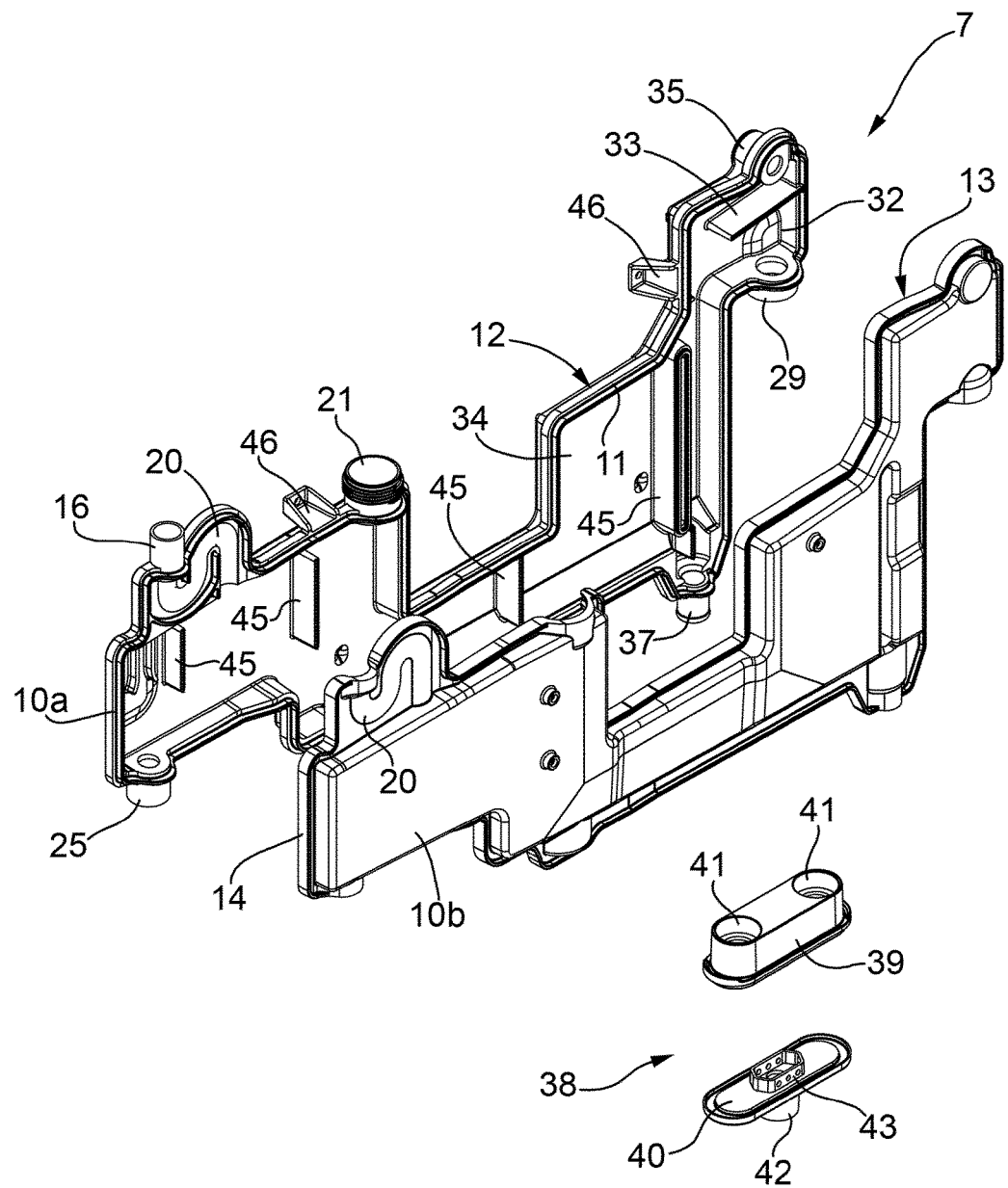
FIG. 4 shows an exploded view in perspective of a second detail of the oven of FIGS. 1 and 2.

As shown in FIG. 4, the tank 7 comprises two shells 10, each of which preferably presents a substantially U-shaped form, is cup-shaped, presents a concavity facing the other shell 10, and is made of a polymeric material, in particular an injection-moulded polymeric material. The U-shaped form of each shells 10 allows the tank 7 to be mounted on a back wall of an oven surrounding a motor device (not shown in the figures) arranged on a seat 50 formed on said back wall.

One of the shells 10 (hereinafter referred to as 10a) preferably presents a coupling rib 11, which extends along a peripheral edge 12 of the shell 10a, presents an annular shape, and, when the shells are coupled, it is housed inside an annular coupling seat 13, which is obtained along a peripheral edge 14 of the other shell (hereinafter referred to as 10b).

After the rib 11 has been inserted into the seat 13, the two shells 10a, 10b are coupled to each other along a junction line 15 (FIG. 1), which extends in a containing plane that is substantially parallel to the opening (not shown) of the chamber 3. The shells 10a, 10b are permanently connected to each other along the line 15 without the interposition of gaskets, in particular by means of welding, preferably but not necessarily by means of vibration welding.

With reference to FIGS. 1, 2, and 4, the tank 7 presents a first sleeve 16, which is manufactured as one single piece together with the shell 10a, is preferably obtained substantially in correspondence to one lateral end of an upper section of the edge 12, projects upwards from the shell 10a, and is connected to a filling duct 17 for filling the tank 7 itself.

The duct 17 extends between the wall 4 and the sleeve 16, and comprises an inlet section 18 inclined downwards and a substantially vertical outlet section 19, which are suited to allow the tank 7 to be filled with water by gravity.

The tank 7 is provided, furthermore, with an air trap 20, which is manufactured partly on the shell 10a and partly on the shell 10b, and is obtained at the inlet of the sleeve 16, so as to prevent the steam from flowing along the duct 17 and from leaving the oven 1 through the wall 4.

The tank 7 presents, furthermore, a second sleeve 21, which is manufactured as one single piece together with the shell 10a, is preferably obtained in correspondence to an intermediate point of the upper section of the edge 12, projects upwards from the shell 10a, and is threaded on the outside, so as to allow the screwing of a level sensor 22.

The sensor 22 comprises a support rod 23 projecting inside the tank 7, and a float 24, which is coupled to the rod 23 in a sliding manner, so as to move between a lowered position corresponding to the minimum water level in the tank 7 and a raised position corresponding to the maximum water level in the tank 7 itself. The position of the float 23 along the rod 23 can be sensed by a sensing device, known per se, that outputs a signal to a display device indicating intelligibly to a user, in one case, the emptying of the tank 7 and, in the other case, the complete filling of the tank 7 itself.

The tank 7 is provided, furthermore, with a third sleeve 25, which is manufactured as one single piece together with the shell 10a, is preferably obtained in correspondence to a lateral end of a lower section of the edge 12, projects downwards from the shell 10a, and allows an overflow duct 26 to be connected to the tank 7.

The duct 26 comprises an inlet section 27, which is substantially vertical and projects inside the tank 7, and an outlet section 28, which communicates with the chamber 3, and is inclined downwards, so as to discharge into the chamber 3, by gravity, the excess water introduced by a user into the tank 7.

The tank 7 presents, furthermore, a fourth sleeve 29, which is manufactured as one single piece together with the shell 10a, is preferably obtained in correspondence to a lateral end of the lower section of the edge 12 opposite to the sleeve 25, projects downwards from the shell 10a, and allows the tank 7 to be connected to the upper end of a substantially vertical duct 30, which defines part of the steam generator 8, and is associated to a heating device 31, which is mounted on the duct 30 itself.

Due to the water evaporation in the duct 30, the generator 8 feeds through the sleeve 29 a mixture, which consists partly of steam and partly of water, and is caused to move forward into a separation chamber 32, which is shaped so as to allow the separation of water from the steam.

The chamber 32 is preferably obtained in correspondence to an upper lateral portion of the tank 7, extends both above the level defined by the inlet of the overflow duct 26 and above the level defined by the raised position of the float 24, and is limited on the upper side by a substantially horizontal inner deflector 33, which is manufactured as one single piece together with the shell 10a, and projects inside the tank 7 perpendicular to a bottom wall 34 of the shell 10a, so as to deviate downwards and into the tank 7 the water fed through the sleeve 29.

The chamber 32 communicates with the feeding circuit 9 by means of a fifth sleeve 35, which is manufactured as one single piece together with the shell 10a, is preferably obtained in correspondence to a lateral end of the upper section of the edge 12 opposite to the sleeve 16, projects horizontally from the wall 34 along a direction which is perpendicular to the horizontal direction 5 and to the opening provided for introducing food products inside the chamber 3. Said fifth sleeve 35 allows the tank 7 to be connected to a feeding duct 36, which defines part of the feeding circuit 9, and feeds the steam to at least one delivery nozzle (not shown), which is mounted inside the chamber 3.

The tank 7 presents, furthermore, a sixth sleeve 37, which is manufactured as one single piece together with the shell 10a, is preferably obtained in correspondence to an intermediate point of the lower section of the edge 12, and projects downwards from the shell 10a itself.

Figure 3:
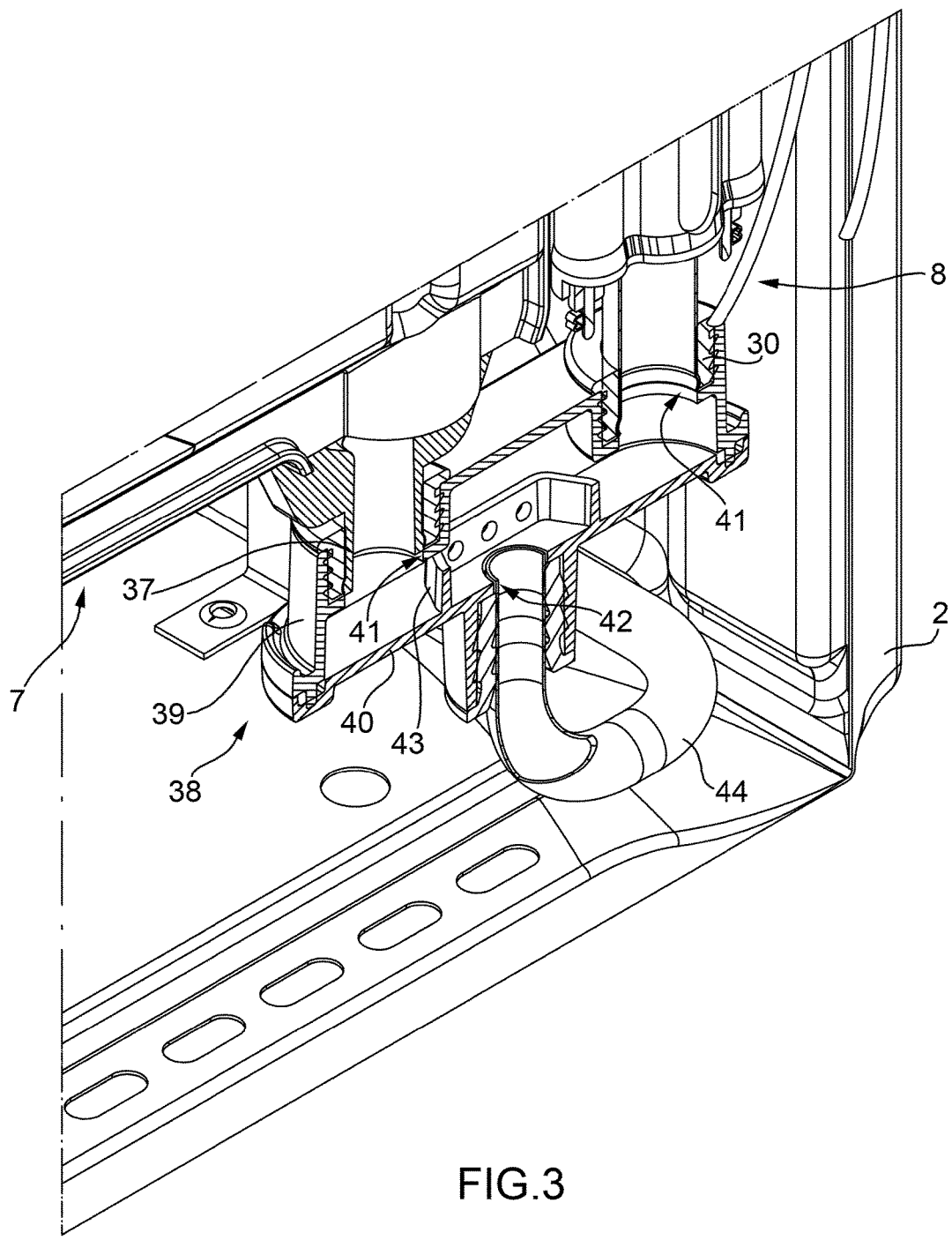
FIG. 3 shows a schematic view in perspective, with sectioned parts and parts removed for clarity, of a first detail of the oven of FIGS. 1 and 2.

With reference to FIGS. 3 and 4, the tank 7 is associated, furthermore, to a filtering device 38, which is mounted outside and beneath the shells 10a, 10b, and comprises an upper cup-shaped body 39, which is arranged with its concavity facing downwards, is hooked in a removable manner to the sixth sleeve 37 and to the lower end of the steam generator duct 30, and is closed by a lower lid 40, which is mounted in a removable manner on the body 39 itself.

The device 38 presents two ports 41, which are obtained through a bottom wall of the body 39 and are respectively coupled to the sixth sleeve 37, so as to admit water inside body 39, and to the steam generator duct 30 to supply the latter with water and is provided with an outlet 42, which is obtained through the lid 40. The outlet 42 is preferably interposed between the two ports 41 such that water passing from a port 41 to the other port 41 passes also over outlet 42.

The outlet 42 communicates with ports 41 through a perforated annular collar 43, which projects from the lid 40 into the body 39, and extends around the outlet 42, so as to prevent the limescale present in the water to reach the outlet 42 itself. The outlet 42, furthermore, is connected to a discharge duct 44, which extends between the device 38 and the wall 4, and allows the user to empty the tank 7.

In order to limit the heat exchange between the part of the tank 7 corresponding to the sleeve 16 and to the air trap 20 and the part of the tank 7 corresponding to the separation chamber 32 and in order to guarantee a correct operation of the sensor 22, the tank 7 is provided with a plurality of substantially vertical dividing baffles 45 (in particular four baffles 45), which are manufactured as one single piece together with the shell 10a, project inside the tank 7 perpendicular to the wall 34, and are arranged at a given distance from the edge 12.

The tank 7 is provided, furthermore, with a plurality of fixing brackets 46, which are manufactured as one single piece together with the shell 10a, so a to allow the tank 7 to be fitted to the frame 2. If preferred, said plurality of fixing brackets 46 may be formed as a single piece part on one of the two shells 10a, 10b and part on the other shell.

According to some variants that are not shown:

each sleeve 16 and/or 21 and/or 25 and/or 29 and/or 35 and/or 37 is manufactured as one single piece together with the shell 10b;

each sleeve 16 and/or 21 and/or 25 and/or 29 and/or 35 and/or 37 is obtained partly on the shell 10a and partly on the shell 10b; in this way an inlet/outlet opening formed by each of said sleeve is divided by the tank shell junction line 15.

each dividing baffle 45 is manufactured as one single piece together with the shell 10b; and each dividing baffle 45 is obtained partly on the shell 10a and partly on the shell 10b.

In use, the tank 7 and the duct 30 of the steam generator 8 are filled with water by the user through the filling duct 17.

Once the float 24 of the level sensor 22 has reached a position comprised between its lowered position and its raised position, or a position equal the latter, the food products to be baked have been inserted into the baking chamber 3, and a steam cooking mode of operation has been selected, the heating device 31 is activated, so as to cause the evaporation of a water amount present in the duct 30.

The mixture of water and steam generated by the heating of the water present in the duct 30 is fed through the sleeve 29 into the separation chamber 32, where the water bounces against the deflector 33, so as to be recirculated again in the tank 7, while the steam is fed, first of all, through the sleeve 35, then along the duct 36 of the feeding circuit 9, and, finally, into the baking chamber 3.

With reference to what has been described above, it should be pointed out that:

the excess water introduced by the user into the tank 7 through the duct 17 is discharged into the baking chamber 3 through the overflow duct 26;

at the end of one or more baking cycles, the tank 7 may be emptied by the user through the discharge duct 44;

the position and the shape of the filtering device 38 allow an easy maintenance and cleaning of the filtering device 38 itself by simply removing the lid 40 from the body 39;

the permanent connection of the shells 10a, 10b does not require the use of gaskets and allows the whole tank 7 to be inserted in the assembly line of the oven 1; and the fact that the separation chamber 32 is built-in in the tank 7 allows a reduction of the number of components used while assembling the oven 1 itself.

In addition, a tank 7 made according to the invention allows an easy installation of a water level sensor device 22 that may be inspected/removed by the tank 7 at any time. Furthermore, the provision of one or more sleeve 16, 21, 25, 29, 35, 37 formed partly on the shell 10a and partly on the shell 10b simplify the manufacture process of the tank 7 because reduces the number of runners to be installed in a mould when forming each of the two shells 10a, 10b. In fact, by forming one or more sleeve 16, 21, 25, 29, 35, 37 as disclosed above, the joining direction of the shells 10a, 10b of the tank 7 is the same as the demoulding direction of each of the shells in the injection-moulding machine, and it is perpendicular to the tank shells assembly plane.

The invention claimed is:

1. An oven for baking food products comprising a baking chamber (3), and a feeding unit (6) for feeding steam into the baking chamber (3), the feeding unit (6) comprising a tank (7) for containing water, a steam generator (8) in fluid communication with the tank (7), a feeding circuit (9) for feeding steam produced by the steam generator (8) into the chamber (3), and a separation chamber (32) for separating the mixture of water and steam fed by the steam generator (8) to the feeding circuit (9); wherein the tank (7) comprises two shells (10a, 10b), which are permanently connected to each other along a junction line (15); and wherein the separation chamber (32) comprises a deflector (33) that projects inside the separation chamber (32).

2. An oven according to claim 1, wherein the shells (10a, 10b) are connected to each other by means of welding.

3. An oven according to claim 1, wherein each shell (10a, 10b) is made of a polymeric material.

4. An oven according to claim 1, wherein the baking chamber (3) comprises an opening for the insertion of the food products to be baked and a closing door for closing the opening itself; the junction line (15) extending in a containing plane that is substantially parallel to said opening.

5. An oven according to claim 1, wherein one of the two shells (10a, 10b) presents a coupling rib (11) extending along said junction line (15), while the other presents a seat (13), which extends along said junction line (15), as well, so as to receive the coupling rib (11) itself.

6. An oven according to claim 1, the separation chamber (32) being manufactured as one single piece together with at least one of said shells (10a, 10b).

7. An oven according to claim 1, wherein the feeding unit (6) comprises, furthermore, an inlet (16, 17) of the water into the tank (7) and an air trap (20) for preventing the steam from reaching the outer environment through the inlet (16, 17) itself; the air trap (20) being manufactured as one single piece together with at least one of said shells (10a, 10b).

8. An oven according to claim 1, wherein the tank (7) presents, furthermore, at least one coupling sleeve (16, 25, 29, 35, 37) for connecting the tank (7) to a relative feeding duct (17, 26, 30, 36); the coupling sleeve (16, 25, 29, 35, 37) being manufactured as one single piece together with at least one of said shells (10a, 10b).

9. An oven according to claim 8, wherein the coupling sleeve (16, 25, 29, 35, 37) is entirely obtained on one single shell (10a, 10b) or partly on one shell (10a, 10b) and partly on the other shell (10a, 10b).

10. An oven according to claim 1 and comprising, furthermore, a support frame (2) of the baking chamber (3) and fixing means (46) for fitting the tank (7) to the support frame (2); the fixing means (46) being manufactured as one single piece together with at least one of said shells (10a, 10b).

11. An oven according to claim 1, wherein the feeding unit (6) comprises, furthermore, a level sensor (22) for detecting the water level inside the tank (7); the tank (7) presenting a connecting sleeve (21) manufactured as one single piece together with at least one of said shells (10a, 10b), so as to connect the level sensor (22) to the tank (7) itself.

12. An oven according to claim 1, wherein the tank (7) presents at least one inner dividing wall (45), which is substantially perpendicular to a containing plane of said junction line (15), said at least one inner dividing wall 45 being formed entirely on a single shell (10a, 10b) or partly on one shell (10a, 10b) and partly on the other shell (10b, 10a).

13. An oven according to claim 1, wherein the feeding unit (6) comprises, furthermore, a water discharge (44) for discharging the water from the tank (7) and a filtering device (38) for filtering the water fed to the discharge (44) itself; the filtering device (38) being mounted outside of said tank (7).

14. An oven according to claim 13, wherein the filtering device (38) is connected to said shells (10a, 10b) in a removable manner.

15. An oven according to claim 13, wherein the filtering device (38) comprises a first port (41) communicating with the tank (7), a second port (41) communicating with the steam generator (8), and an outlet (42) communicating with said discharge (44).

16. An oven according to claim 3, wherein each shell (10a, 10b) is made of an injection-moulded polymeric material.

* * * * *